(No Model.)
F. H. LOVERIDGE.
DYNAMO ELECTRIC MACHINE.
No. 500,403. Patented June 27, 1893.
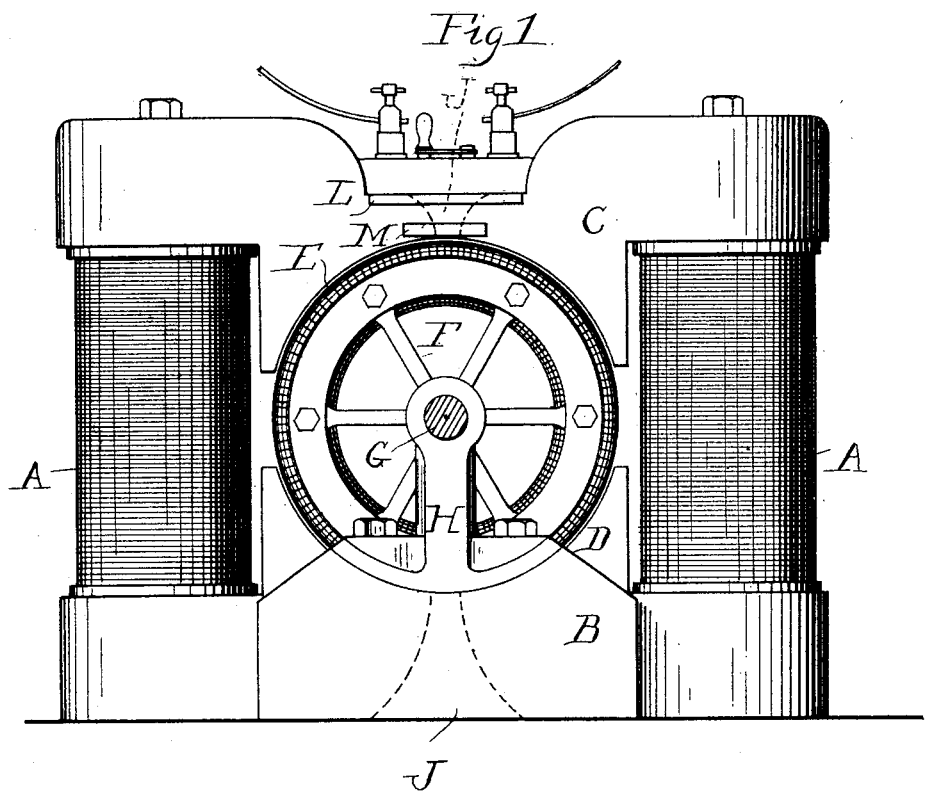
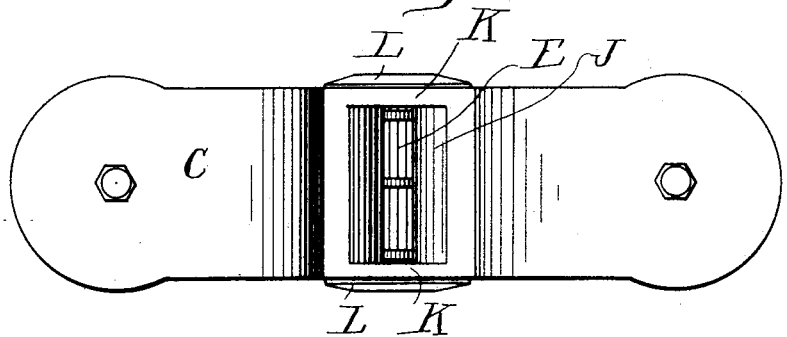
WITNESSES
Walter J. Gunthorp
Edith Black
INVENTOR
Fred H. Loveridge
BY Frances W. Parker,
ATTORNEY

UNITED STATES PATENT OFFICE.

FREDERICK H. LOVERIDGE, OF CHICAGO, ILLINOIS, ASSIGNOR TO THE STANDARD ELECTRIC COMPANY, OF SAME PLACE.

DYNAMO-ELECTRIC MACHINE.

SPECIFICATION forming part of Letters Patent No. 500,403, dated June 27, 1893.

Application filed October 22, 1892. Serial No. 449,712. (No model.)

*To all whom it may concern:*

Be it known that I, FREDERICK H. LOVERIDGE, a citizen of the United States, residing at Chicago, Cook county, Illinois, have invented a new and useful Improvement in Dynamo-Electric Machines, of which the following is a specification.

My invention relates to dynamo electric machines and has for its object to provide means for securing high efficiency and economic operation in dynamos. It is illustrated in the accompanying drawings, wherein—

Figure 1, is an end view of the machine. Fig. 2, is a plan view of the pole piece.

Like parts are indicated by the same letter in both the figures.

A A are the coils, B the bed plate, C the upper pole piece opposed to which is a similar lower pole piece D. These pole pieces are shaped as shown so as to connect the ends of the cores of the coils of the field magnets and to inclose so far as may be possible the armature E which is itself supported by a spider F on the shaft G. This shaft G is journaled in the standards H which rise from the bed piece B. At the vertical median line I work out an aperture or slot J, shaped as shown, with a large upper opening and a lower comparatively narrow opening in proximity to the rotating armature. Thin walls, K K are left at the ends of this slot or aperture, and these walls are strengthened by exterior ribs L and M, near the top and bottom of such slot respectively. I work out a similar slot J in the lower pole piece D.

The use and operation of my invention are as follows: The cutting out of the pole piece, or yoke, connecting the ends of the cores of the field magnet, tends to concentrate the magnetic field at the point or points where its influence is greatest on the armature. The least possible metal is desired and therefore I form the slot as shaped, leaving but a thin wall at each end, and to reinforce or to strengthen this wall, I throw out laterally projecting ribs which have little effect upon the field or the action of the magnets, but greatly strengthen the yoke. The lower pole piece is similarly slotted, as indicated, but has no exterior ribs, for here the metal is supported by the two plates. By slotting the pole piece the wire on the armature for sparkless running at a given current may be increased, hence the voltage of a given size of machine may be increased. The effect is also to steady the current to a certain extent.

I claim—

1. In a dynamo electric machine, the combination of field magnets with pole pieces which connect the ends of the magnet cores, said pole pieces provided each with slots shaped as shown so as to leave thin metallic plates connecting the two ends of such pole pieces.

2. In a dynamo electric machine, a pole piece which connects the two field magnets, provided with a slot intermediate between the magnets, said slot nearly severing such pole piece, and exterior laterally projecting ribs across the ends of such slot to strengthen the metal.

FRED. H. LOVERIDGE.

Witnesses:
WALTER J. GUNTHORP,
EDITH BLACK.